US008943177B1

(12) United States Patent
Peters et al.

(10) Patent No.: US 8,943,177 B1
(45) Date of Patent: Jan. 27, 2015

(54) MODIFYING A COMPUTER PROGRAM CONFIGURATION BASED ON VARIABLE-BIN HISTOGRAMS

(75) Inventors: Gavin Wayne Kenny Peters, Cambridge, MA (US); Michael Kleber, Newtown, MA (US)

(73) Assignee: Google Inc., Mountain View, CA (US)

( * ) Notice: Subject to any disclaimer, the term of this patent is extended or adjusted under 35 U.S.C. 154(b) by 244 days.

(21) Appl. No.: 13/182,211

(22) Filed: Jul. 13, 2011

(51) Int. Cl.
*G06F 15/177* (2006.01)
(52) U.S. Cl.
USPC ............ 709/221; 709/220; 709/223; 709/224
(58) Field of Classification Search
CPC ... G05B 23/0264; G06F 21/55; G06F 21/552; G06F 21/577; G06F 2221/2101; G06F 2221/2113; G06F 2221/2119; H04L 63/0263; H04L 63/1416; H04L 63/1425; H04L 63/1441; H04L 63/145; H04L 63/20; Y04S 40/162
USPC .................... 709/220–221, 223, 224; 712/15; 713/100
See application file for complete search history.

(56) References Cited

U.S. PATENT DOCUMENTS

| | | | | |
|---|---|---|---|---|
| 6,782,518 | B2 * | 8/2004 | Decker | 716/106 |
| 7,039,017 | B2 * | 5/2006 | Sherlock | 370/252 |
| 7,117,079 | B2 * | 10/2006 | Streichsbier et al. | 701/114 |
| 7,409,592 | B2 * | 8/2008 | Decker | 714/25 |
| 2007/0294369 | A1 * | 12/2007 | Ginter et al. | 709/217 |
| 2008/0071888 | A1 * | 3/2008 | Cohen et al. | 709/220 |

* cited by examiner

*Primary Examiner* — Phuoc Nguyen
*Assistant Examiner* — Davoud Zand
(74) *Attorney, Agent, or Firm* — Sterne, Kessler, Goldstein & Fox P.L.L.C.

(57) ABSTRACT

A system for modifying a configuration of a computer program includes an encoded data receiver for receiving a plurality of encoded data values from a sample collector on a first computer, the encoded data values generated from operation of the computer program. The system also includes a bin generation value selector, for selecting a bin generation value for each of the bin data values based on a seed value and a histogram reconstructor for reconstructing, for each of the received encoded data values, an associated histogram structure based on the bin generation value associated with each encoded data value. A bin data analyzer generates a result based on the received encoded data values and the reconstructed histogram structure associated with each encoded data value. Finally, a configuration generator generates a configuration setting based on the result, and the configuration is sent to the first computer.

21 Claims, 8 Drawing Sheets

MODIFYING A COMPUTER PROGRAM CONFIGURATION BASED ON VARIABLE-BIN HISTOGRAMS

FIELD

The present application generally relates to collecting data from software applications and sending the data to a remote server.

BACKGROUND

Modern applications have a broad variety of characteristics that can affect application performance. Software developers can distribute these applications to remote users and install the applications on remote computer systems. Many developers maintain a network connection within their remotely installed applications, collecting information and remotely modifying application characteristics. Even if applications are not remotely modified based on the collected data, later versions of a software application can be designed based on the information.

Different approaches are taken by conventional applications to collecting operational information from a computer application and sending the information to a server computer. Users of computer applications are often concerned about different aspects of the data sending process. One aspect of concern for users involves the bandwidth consumption and performance degradation that can result from sending collected data from their computers. Another aspect that concerns users is the collecting and sending of information that affects their privacy.

Software developers seek to collect as much useful information as possible about application operation, without impacting the user experience or raising user concerns.

BRIEF SUMMARY

Embodiments described herein relate to a method, system and computer program product for modifying a configuration of a computer program. According to an embodiment, a system for modifying a configuration of a computer program includes an encoded data receiver for receiving a plurality of encoded data values from a sample collector on a first computer, the encoded data values generated from operation of the computer program. The system also includes a bin generation value selector, for selecting a bin generation value for each of the encoded data values based on a seed value and a histogram reconstructor for reconstructing, for each of the received encoded data values, an associated histogram structure based on the bin generation value associated with each encoded data value. A bin data analyzer generates a result based on the received encoded data values and the reconstructed histogram structure associated with each encoded data value. Finally, a configuration generator generates a configuration setting based on the result, and the configuration is sent to the first computer. Further features and advantages, as well as the structure and operation of various embodiments are described in detail below with reference to the accompanying drawings.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Overview

Figure 1:
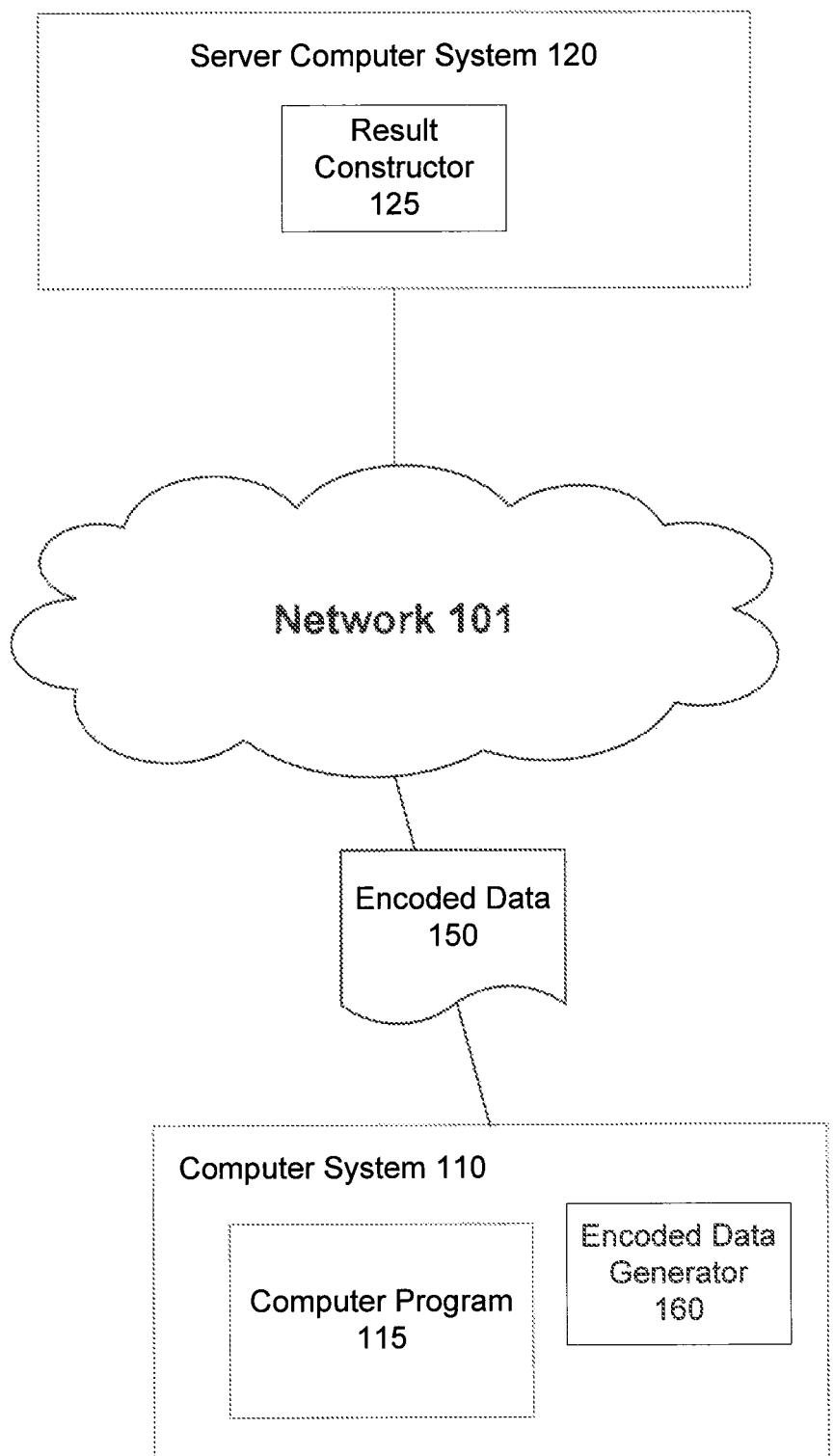
FIG. 1 is a block diagram depicting an example network application architecture having a result constructor and an encoded data generator.

FIG. 1 is an example network application architecture 100 in which embodiments of the present system and method, or portions thereof, may be implemented. FIG. 1 has a server computer system 120, a network 101 and a computer system 110. Computer system 110 has a computer program 115 and an encoded data generator 160, such encoded data generator used to generate encoded data 150. Server computer system 120 has a result constructor 125.

Generally speaking, an embodiment of the method, system and computer program product described herein modifies a configuration of computer program 115 on computer system 110 by using encoded data generator 160 to monitor the operation of the computer program, collect data values and generate a histogram structure and a bin value for each of the data values. Once generated, encoded data 150 are sent to server computer system 120 where they are constructed into results by result constructor 125, and a configuration setting for computer program 115 is generated. The configuration setting is used to change the configuration of the computer program.

In an initial stage of using an embodiment, a measurable quantity associated with operation of computer program 115 is selected, such measurable quantity being relevant for the configuration of computer program 115.

In an example where computer program 115 is a web browser, the user experience of the web browser can be selected for improvement. One approach to improving the user experience for a web browser is to increase the display speed of requested items. One approach to increasing this speed is the optimal use of a browser cache. Browser caches can have default expiration times for cached pages, where the shorter the expiration time, the faster a page is to be evicted from the cache. Page eviction can beneficially make a cache more current, but can also reduce cache hit rates. To beneficially change the default expiration time for the example web browser computer program 115, cache hit rates can be collected and use these to select a modified expiration time for the browser cache.

To further configure an embodiment, an estimate of the range of possible values for the identified quantity is determined. For example, based on existing data, the developer may estimate the maximum number of cache hits per hour to be one hundred and the minimum number of cache hits per hour is zero. As used typically herein, this range of values can be referred to as the type of value measured.

Encoded Data Generator

Figure 2:
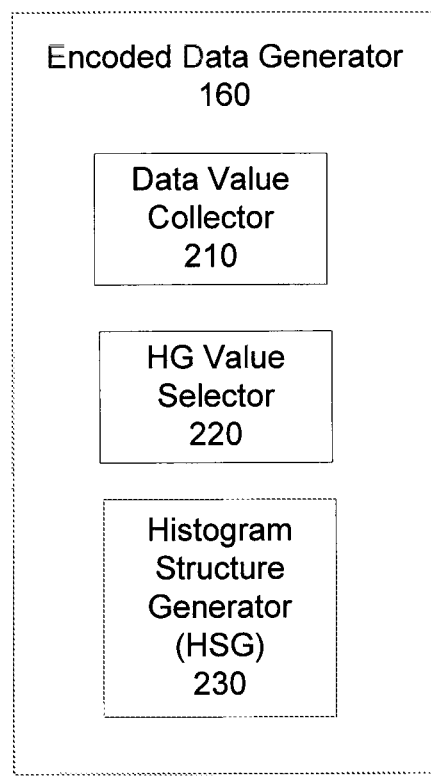
FIG. 2 is a more detailed view of an encoded data generator.

FIG. 2 is a more detailed view of encoded data generator 160. An encoded data generator includes data value collector 210, a histogram generation (HG) value selector 220 and a histogram structure generator (HSG) 230. As introduced with the description of FIG. 1 above, the steps performed by some embodiments are divided into two phases: the encoded data generation stage and the results construction stage. The list C1-C8 below is intended to be a non-limiting list of some illustrative steps performed in the encoded data generation phase. Items C1-C8 are as follows:

C1. Sample Collection: A sample of the selected quantity is collected by data value collector 410 from the monitoring of computer program 115. As would be appreciated by one having skill in the relevant art(s), given the description herein, a variety of different approaches can be used by embodiments of data value collector 410 to collect quantity samples from the operation of computer program 115. For example, on the web browser noted above, the quantity of cache misses per hour is determined by an internal web browser process. In this example, a first quantity of cache misses per hour is determined to be 23 and a second value is determined to be 85, such values being received by encoded data generator 160.

C2. Histogram Generation (HG) Value Selection: To enable the generation of histograms, a histogram generation (HG) value is selected by HG value selector 220. One approach used by an embodiment to select HG values uses a pseudorandom number sequence initialized by a seed value. A seed value (also known as a random seed) can be used to set a first value for the pseudorandom sequence, and also specify how the pseudo random sequence is generated. As used by the embodiment, the seed value used to generate a pseudorandom sequence of HG values can be used to regenerate the same sequence of HG values. The values in the pseudorandom sequence are within the minimum value and maximum value of the quantity sample collected above with item C1.

For example, in the pseudorandom sequence 41,25,52,62, 21,38 the first number (41) is chosen. The next value chosen is (25), etc. The number of values in the pseudorandom number sequence can be very large and the sequence can have repeating values. Continuing the web browser example, because of the estimated range of values to be collected the value range in the example pseudorandom sequence is from 0-100.

Each sample collected by data value collector 410 in stage C1 is paired with a HG value (the next number in the pseudorandom sequence) by HG value selector 220 in stage C2. Continuing the web browser example, the first measured quantity of cache misses (23) is paired with (41) and the second value (85) is paired with 25.

Figure 3:
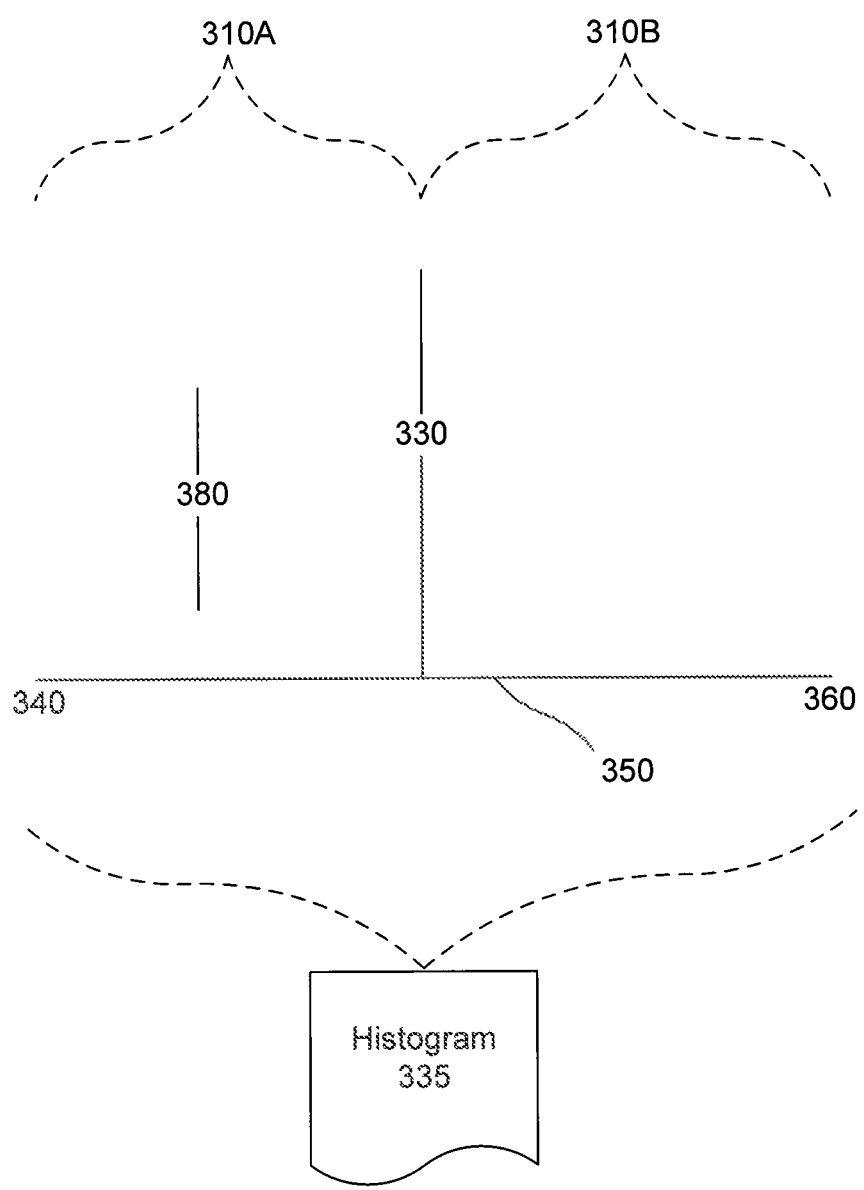
FIG. 3 is an example two bin histogram.

C3. Histogram Generation: FIG. 3 is a detailed view of histogram 335. Histogram 335 includes bins 310A-B with a bin divider 330 on a range 350 between a minimum value 340 and a maximum value 360. Using the seed value from stage C2 described above, a two-bin histogram 335 is generated by histogram structure generator (HSG) 230. Minimum value 340 and maximum value 360 correspond to the minimum and maximum values estimated in the discussion of FIG. 2 above. For each of the bin values, the determining of an associated histogram structure is based on the currently selected HG value from the pseudorandom sequence discussed above.

In the cache hit rate example, minimum value 340 is zero (0) and maximum value 360 is one-hundred (100). Bin divider 330 is placed at the seed value (e.g., 41, the first number) in the pseudorandom sequence discussed above with respect to stage C2 above. Based on the placement of bin divider 330, a left bin 310A includes values from 0 to 41 and a right bin 310B includes values from 42 to 100.

Figure 4:
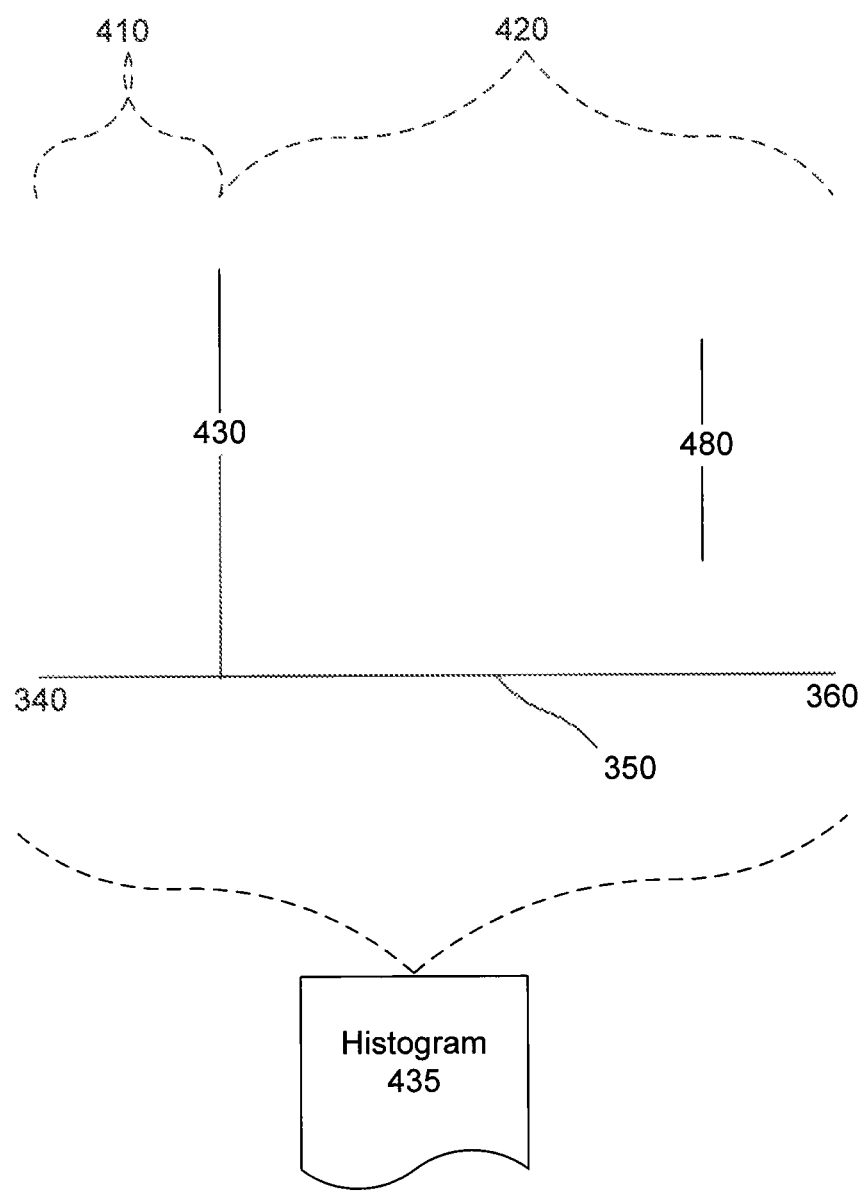
FIG. 4 is another example two bin histogram.

FIG. 4 is another detailed view of a histogram, according to a further embodiment. A histogram 435 includes bins 410A-B with a bin divider 430 on range 350 between minimum value 340 and maximum value 360. Based on the second HG value (e.g., from the pseudorandom number sequence) in the web browser example, bin divider 430 is placed in histogram 435.

C6. Encoded Sample Value Generation: The collected sample is placed in the generated histogram, and the bin within which it is placed is noted. Thus, in the example, the collected sample value 23 is placed in the left bin of the histogram (0-67), and the left bin is coded as zero (0). In this example, if the sample were placed in the right bin, the bin placement would be coded as one (1). After a collected sample value is placed in a generated histogram, it can be termed a coded sample value. When collected sample values (65,10,25,79,35,10). are paired with histograms generated between 0 and 100 by the example pseudorandom sequence (41,25,52,62,21,38), coded sample values (1,0,0,1,1,0) result.

As would be appreciated by one having skill in the relevant art(s), given the description herein, a pseudorandom sequence can be used to generate more than two bins, and samples collected can be placed in these bins. In an embodiment where more than two bins are used, additional coding values (2,3, etc.) can be used.

As would also be appreciated by one having skill in the relevant art(s), given the description herein, other approaches can also be used to generating histograms for coding collected sample values.

C7. Coded Sample Value Storage: Coded sample values are stored for further use with the pseudorandom number and the determined bin placement. In the example, the first bin instance is (67,0). In another embodiment, because the pseudorandom number sequence can be determined from only the seed value, only the sequence of coded sample values and the seed value needs to be stored.

C8. Repeat: The above sample collection steps C1-C7 are then repeated for a number of samples.

As would be appreciated by one having skill in the relevant art(s), given the description herein, other approaches similar to items C1-C8 above may be used to collect and encode data samples without departing from the spirit of the system and method described herein.

Result Constructor

Figure 5:
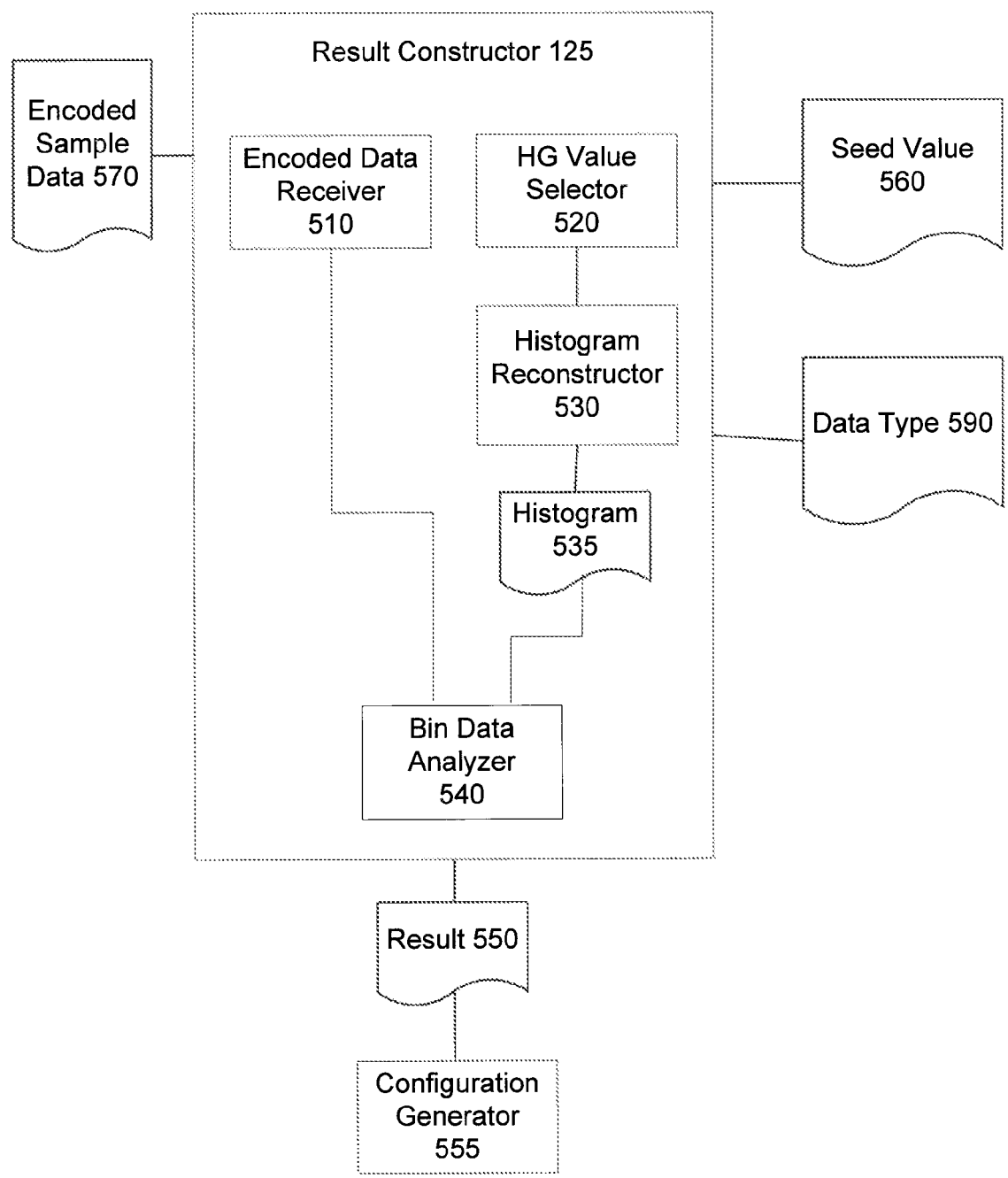
FIG. 5 is a more detailed view of a result constructor.

FIG. 5 is a more detailed view of result constructor 125. Result constructor 125 includes an encoded data receiver 510, a histogram generation (HG) value selector 520, a histogram reconstructor 530, a bin data analyzer 540 and results 550. Result constructor 125 receives encoded sample data 570, data type 590 and seed value 560. Result constructor 125 is used in a result construction phase designed to use the generated bin instances from stage C6 above to construct useful results. The result can describe the operation of computer program 115.

One useful result that can be constructed from coded sample values is a cumulative distribution curve that reflects the cumulative distribution of the collected samples. A used typically herein, a cumulative distribution function (CDF) (or just distribution function), describes the probability that a real-valued random variable value with a given probability distribution will be found at a value less than or equal to the variable value. Described differently, it is the "area so far" function of the probability distribution. Cumulative distribution functions can also be used to specify the distribution of multivariate random variables.

In the web browser example, on server computer system 120, the coded sample values can be constructed by result constructor 125 into a cumulative distribution curve of the collected cache hits per hour metric.

The list R1-R9 below is intended to be a non-limiting listing of some illustrative steps performed in the reconstructing phase to construct a CDF. Items R1-R9 are as follows:

R1. Sample Receipt: Encoded data receiver 510 receives encoded sample values 570 from encoded data generator 160.

R2. Seed Selection: In one embodiment, seed controller 520 receives a seed value 560 from encoded data generator 160. From this initial seed value, seed controller 520 can use the known pseudorandom sequence noted in stage C2 above to select a HG value for each received bin instance in encoded sample values 570. In another embodiment, encoded data generator 160 can send a HG value with each value of encoded sample values 570.

R3. Data Type Determination: For the histogram reconstruction stage, a data type for the received encoded sample values 570 is determined by result constructor 125. As discussed above, the data type for the samples typically corresponds to the possible range of values for the data. As noted with the web browser example above, the possible range of values for cache hits per minute is from zero (0) to one hundred (100). In one embodiment, this data type can be relayed to result constructor 125 by encoded data generator 160. In another embodiment, result constructor can estimate the data value by analyzing encoded sample values 570 and the reconstructed histograms. For example if no samples are included in encoded sample values 570 above a particular value, then a maximum can be estimated.

R4. Histogram Reconstruction: Based on the received seed value 560 and encoded sample values 570, histogram reconstructor 530 reconstructs the histogram generated for each value of encoded sample values 570.

R5. Sample Placement: Based on the histogram reconstruction, and the received coded sample value for the reconstructed histogram, a "greater than" or "less than" sample is available for further analysis.

R6. Determine Sample Size: For result determination stages discussed below, a sample size is determined and stored for use in determining results.

R7. Aggregate the Encoded Data for Analysis: The reconstructed histograms and encoded data values are aggregated by bin data analyzer 540 such that different results can be determined. Results determination is discussed with the description of FIG. 6 below.

As would be appreciated by one having skill in the relevant art(s), given the description herein, other approaches similar to items R1-R7 above may be used to reconstruct the histograms from the encoded data value generation stages described with FIGS. 2-4 above.

Result Determination

Figure 6:
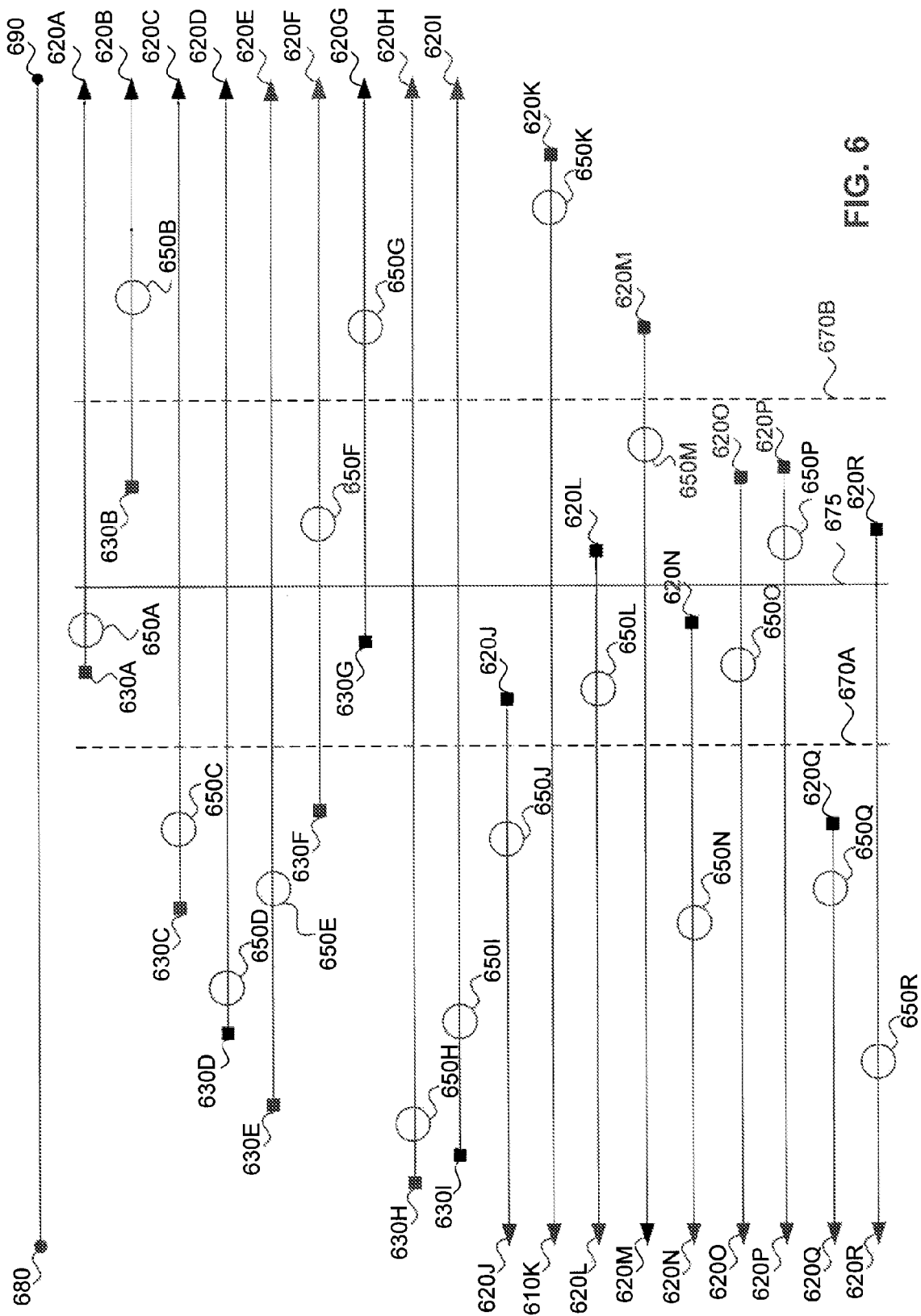
FIG. 6 is a collection of bin value samples, according to an embodiment.

FIG. 6 shows collected samples 650A-R between minimum value (0) 680 and maximum value (100) 690. Plotted bin divider values 630A-R show the variable bin histogram generated for each collected sample, and the arrows pointing to the left or the right show the coded sample value for each collected sample. It is important to note that, at this stage, collected sample values 650A-R are not available to bin analyzer 540, only the data range (680 to 690), bin divider values 630A-R and the coded sample values, e.g., left or right, greater or less than, 0 or 1. It should be noted that example collected samples values 630A-R are different from the example collected samples discussed above.

As noted above, one of the results that can be generated from the coded sample data is a cumulative distribution function (CDF). Generally speaking, to estimate what fraction of client-observed values are equal to an arbitrary value v, one embodiment considers all samples collected that are very close to a particular value (e.g., between v−e and v+e for some small e), and checks what fraction of the total samples collected have a value less than the selected value.

As would be appreciated by one having skill in the relevant art(s), given the description herein, as the total amount of data becomes larger, the sample width (e) can become smaller, and the estimate becomes more accurate. For example, when the total volume of data increases by a factor of four, (e) could be halved (making the bin half as wide) and still have twice as many observations in the tested range. This leads to both increased spatial resolution and an estimate with smaller expected error. For example, in the mathematical limit where (e) tends to zero, the CDF reconstruction approaches perfect.

The following stages F1-F5 below in intended to illustrate the above described approach used to determine result 550, for example, CDF described above for a selected analysis value 675, e.g. 50. This sample analysis point 675 is selected from minimum value 680 to maximum value 690. As noted above with respect to FIGS. 3 and 4 above, the range of values corresponds to the data type of the collected sample. Stages F1-F5 are listed below:

F1. Select a sample width to define a range of analysis on both side of a selected point 675. This width can be different sizes and based on different factors. On FIG. 6, the sample width is the distance between point 670A and 670B. In an embodiment, this sample width is based on the total number of samples collected. As the sample size increases, the sample width analyzed can decrease, while maintaining the accuracy of estimates. In the web browser example, 18 samples (650A-R) were collected, the data range is 100, and an example sample width is 20. Based this sample width, and a selected analysis value of 50 for point 675, point 670A is equal to 40 and 670B is equal to 60. It should be noted that this example sample width is selected for convenience, and is not necessarily an appropriate value for a sample size of 18.

F2. Determine the number of bin divider values 630A-R that are in the region between points 670A and 670B. To determine this number, a query is made to bin data analyzer 540. As noted above, the number of collected samples 650A-R in this region is not available at this stage. In this example, nine (9) bin divider values (630A, B, G, J, L, O, P and R) fall into this region.

F3. Determine the fraction of the samples within the region with coded sample values that indicate that the collected value 650 is less than the bin divider 630 value. On FIG. 6, this coded "less than" indication is shown by an arrow pointing to the left, e.g., 620J-R. Of the nine bin divider values 630 in the analysis region, six of the associated collected samples are less than the bin divider value (630J, L, N, O, P, R). Based on this determination (6 samples/9 total), an estimate that ⅔ of the collected samples are below sample analysis point 675. As shown on FIG. 6, the collected samples 650A-R are accurately estimated based on the above approach (12 collected sample values below 50 out of 18 total).

F5. Repeat stages F2 through F3 for various analysis points 675 along the range of collected values. Based on these estimates, a cumulative distribution function of the collected data can be generated.

As would be appreciated by one having skill in the relevant art(s), given the description herein, performing other stages similar to stages F1-F5 above may also be used to generate useful results from the data collected by an embodiment.

Once generated using result constructor 125, result 550 can be analyzed and used by configuration generator 555 to generate a configuration setting for computer program 115. As would be appreciated by one having skill in the relevant art(s), given the description herein, the broad variety of different values measured and results generated by embodiments, can lead configuration generator 555 to generate configuration settings using a broad variety of approaches.

In the web browser example, the results describing cache hits per minute can be used to appropriately change the default expiration time for cache entries. As would also be appreciated by one having skill in the relevant art(s), given the description herein, the approach described above can be used to usefully encode data generally, this approach being especially useful when encoded data needs to be compressed and/or anonymized during transmission. This approach is also useful when data is collected and aggregated from a large and distributed array of information resources.

Aggregated Bin Values

In FIG. 1, a single computer system 110 is depicted with computer program 115 and encoded data generator 160. It is important to note that, encoded data values describing a performance metric of computer program 115 can be collected from multiple computer systems 110 having multiple instances of computer program 115. In the web browser example discussed above with respect to FIGS. 1-6, encoded data values describing cache hits per minute can be collected from multiple web browsers and aggregated into results using the approaches described above.

Method 700

Figure 7:
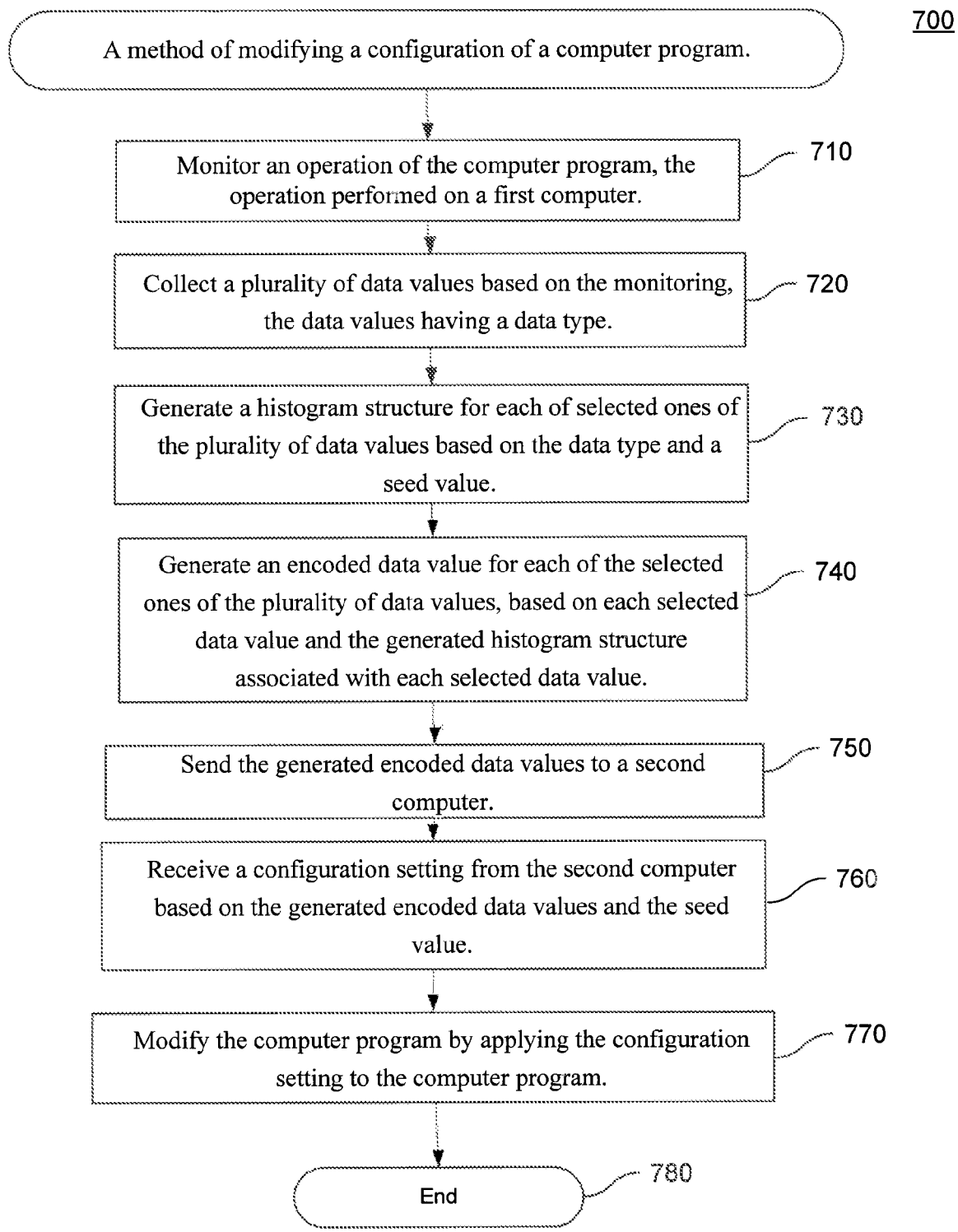
FIG. 7 is flowchart illustrating a method of modifying a configuration of a computer program.

FIG. 7 illustrates a more detailed view of how embodiments described herein may interact with other aspects of embodiments. In this example, a method of modifying a configuration of a computer program is provided.

In stage 710, an operation of the computer program is monitored, the operation being performed on a first computer. In an embodiment, an operation of the computer program, for example computer program 115 of FIG. 1 is monitored, the operation being performed on a first computer, for example computer system 110. After the completion of stage 710, the method proceeds to stage 720.

In stage 720, a plurality of data values are collected based on the monitoring, the data values having a given data type. In an embodiment, a plurality of data values are collected, for example by data value collector 210. After the completion of stage 720, the method proceeds to stage 730.

In stage 730, a histogram structure is generated for each of selected ones of the plurality of data values based on the data type and a seed value. In an embodiment, a histogram structure is generated for each of selected ones of the plurality of data values, for example by HSG 230, based on the data type and a seed value, for example by HG value selector 220. After the completion of stage 730, the method proceeds to stage 740.

In stage 740, an encoded data value is generated for each of the selected ones of the plurality of data values, based on each selected data value and the generated histogram structure associated with each selected data value. In an embodiment, an encoded data value is generated, for example by encoded data generator 160, for each of the selected ones of the plurality of data values, collected, for example, by data value collector 210. After the completion of stage 740, the method proceeds to stage 750.

In stage 750, the generated bin values are sent to a second computer. In an embodiment, the generated bin values, generated, for example, by encoded data generator 160, are sent to a second computer, for example, server computer system 120. After the completion of stage 750, the method proceeds to stage 760.

In stage 760, a configuration setting is received from the second computer, the configuration setting being based on the generated bin values and the seed value. In an embodiment, a configuration setting generated, for example by configuration generator 555, is received from the second computer, for example, server computer system 120, the configuration setting being based on the generated bin values and the seed value. After the completion of stage 760, the method proceeds to stage 770.

Finally, at stage 770, the configuration of the computer program is modified by applying the configuration setting to the computer program. In an embodiment, the configuration of the computer program, for example, computer program 115, is modified by applying the configuration setting to the computer program, for example, the configuration setting generated by configuration generator 555. After the completion of stage 770, the method proceeds to stage 780.

After stage 770, the method ends at stage 780.

Example Computer System Implementation

Figure 8:
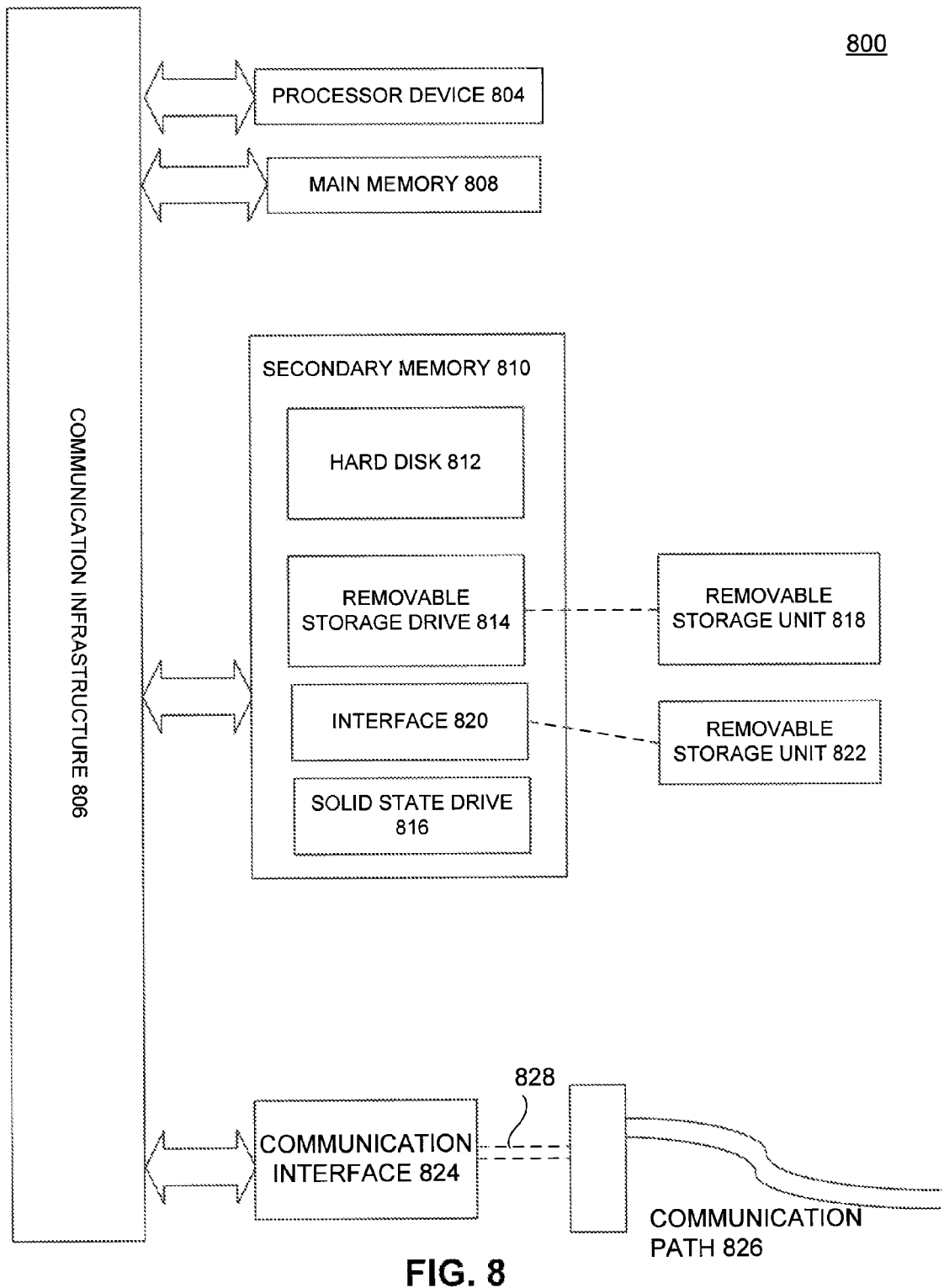
FIG. 8 depicts a sample computer system that may be used to implement an embodiment.

FIG. 8 illustrates an example computer system 800 in which embodiments of the present invention, or portions thereof, may be implemented as computer-readable code. For example, components of FIGS. 1, 2 and 5 and stages of method 700 of FIG. 7 may be implemented in computer system 800 using hardware, software, firmware, tangible computer readable media having instructions stored thereon, or a combination thereof and may be implemented in one or more computer systems or other processing systems. Hardware, software or any combination of such may embody any of the modules/components in FIGS. 1, 2 and 5 and any stage in FIG. 7. Computer system 110 and server computer system 120, can also be implemented having components of computer system 800.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons skilled in the relevant art, processor device 804 may be a single processor in a multi-core/multiprocessor system, such system operating alone, or in a cluster of computing devices operating in a cluster or server farm. Processor device 804 is connected to a communication infrastructure 806, for example, a bus, message queue, network or multi-core message-passing scheme.

Computer system 800 also includes a main memory 808, for example, random access memory (RAM), and may also include a secondary memory 810. Secondary memory 810 may include, for example, a hard disk drive 812, removable storage drive 814 and solid state drive 816. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in electronic, electromagnetic, optical, or other forms capable of being received by communications interface 824. This data may be provided to communications interface 824 via a communications path 826. Communications path 826 carries the data and may be implemented using wire or cable, fiber optics, a phone line, a cellular phone link, an RF link or other communications channels.

In this document, the terms "computer program medium" and "computer readable medium" are used to generally refer to media such as removable storage unit 818, removable storage unit 822, and a hard disk installed in hard disk drive 812. Computer program medium and computer readable medium may also refer to memories, such as main memory 808 and secondary memory 810, which may be memory semiconductors (e.g., DRAMs, etc.).

Computer programs (also called computer control logic) may be stored in main memory 808 and/or secondary memory 810. Computer programs may also be received via communications interface 824. Such computer programs, when executed, enable computer system 800 to implement the present invention as discussed herein. In particular, the computer programs, when executed, enable processor device 804 to implement the processes of the present invention, such as the stages in the method illustrated by flowchart 700 of FIG. 7 discussed above. Accordingly, such computer programs represent controllers of the computer system 800. Where the invention is implemented using software, the software may be stored in a computer program product and loaded into computer system 800 using removable storage drive 814, interface 820, hard disk drive 812 or communications interface 824.

Embodiments of the invention also may be directed to computer program products comprising software stored on any computer useable medium. Such software, when executed in one or more data processing devices, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to methods, system and computer program products for modifying a configuration of a computer program. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of modifying a configuration of a computer program, comprising:
    monitoring an operation of the computer program, the operation being performed on a first computer;
    collecting a plurality of data values based on the monitoring, the data values having a given data type;
    generating a histogram structure for each of selected ones of the plurality of data values plotted on the histogram structure, the histogram structure being based on the data type and a seed value, wherein the data type comprises the numeric range of possible values of the data values, and wherein the seed value comprises a random seed used to set a first value for a pseudorandom sequence and further specifies how the pseudorandom sequence is generated;
    generating an encoded sample value for each of the selected ones of the plurality of data values indicating the generated histogram structure associated with each selected data value;
    sending the encoded sample values to a second computer;
    receiving a configuration setting from the second computer based on the encoded sample values and the seed value; and
    modifying the configuration of the computer program by applying the configuration setting to the computer program.

2. The method of claim 1, wherein monitoring the operation of the computer program comprises monitoring log information generated by the computer program.

3. The method of claim 1, wherein sending the encoded sample values to the second computer further comprises sending the seed value to the second computer.

4. The method of claim 1, wherein the collecting of the plurality of data values having a given data type comprises collecting the plurality of data values, wherein the data type comprises an estimate of the numeric range of possible values of the data values.

5. The method of claim 1, wherein receiving the configuration setting from the second computer based on the encoded sample values and the seed value comprises receiving the configuration setting based on a continuous distribution function.

6. The method of claim 1, wherein the encoded sample value comprises a collected data value paired with a histogram value corresponding to the pseudorandom sequence.

7. A method of modifying a configuration of a computer program, comprising:
    receiving at a second computer, a plurality of encoded sample values from a sample collector on a first computer, the encoded sample values generated from the operation of the computer program;
    for each of the encoded sample values, determining an associated histogram structure based on a seed value, wherein the seed value comprises a random seed used to set a first value for a pseudorandom sequence and further specifies how the pseudorandom sequence is generated;
    selecting an analysis number within the range of values in the determined associated histogram structures of the received encoded sample values;
    determining a total for each selected analysis number, based on the selected analysis number, a bin analysis range, the received bin values and the determined histogram structure for each received bin value;
    generating a plurality of totals and associated analysis numbers by repeating the selecting and determining a number of times;
    generating a result based on the plurality of generated totals and associated analysis numbers;
    generating a configuration setting of a computer program configured to operate on the first computer based on the result; and
    sending the configuration setting to the first computer.

8. The method of claim 7, wherein generating the result comprises generating a continuous distribution function describing the operation of the computer program.

9. The method of claim 7, wherein the bin analysis range is based on a total number of bin values received.

10. The method of claim 1, wherein monitoring the operation of the computer program comprises monitoring the operation of a web browser.

11. The method of claim 1, wherein the monitoring of the operation of the computer program comprises monitoring performance characteristics of the computer program.

12. The method of claim 1, wherein the generating of the configuration setting based on the result comprises generating a configuration setting that is designed to improve the user experience of the computer program.

13. A system for modifying a configuration of a computer program, comprising:
    an encoded data receiver configured to receive a plurality of encoded data values from a sample collector on a first computer, the encoded values generated based on the operation of the computer program;
    a bin generation value selector, configured to select a bin generation value for each of the encoded data values based on a seed value, wherein the seed value comprises a random seed used to set a first value for a pseudorandom sequence and further specifies how the pseudorandom sequence is generated;
    a histogram structure reconstructor implemented on a processor that configured, when executed, reconstructs, for each of the received encoded data values, an associated histogram structure based on the bin generation value associated with each encoded data value;
    a bin data analyzer configured to generate a result based on the received encoded data values and the reconstructed histogram structure associated with each encoded data value; and
    a configuration generator configured to generate a configuration for a computer program setting based on the result and send the configuration setting to the first computer.

14. The system of claim 13, wherein the result comprises a continuous distribution function describing the operation of the computer program.

15. The system of claim 13, wherein the bin data analyzer is further configured to:
(a) select an analysis number within the range of values in the determined associated histogram structures of the received encoded data values;
(b) determine a total for each selected analysis number, based on the selected analysis number, a bin analysis range, the received encoded data values and the determined histogram structure for each received encoded data value;
(d) generate plurality of totals and associated analysis numbers by repeating steps (b) and (c) for a number of times; and
(e) generate the result based on the plurality of generated totals and associated analysis numbers.

16. The system of claim 15, wherein the bin analysis range is based on a total number of encoded data values received.

17. The system of claim 13, wherein the computer program is a web browser.

18. The system of claim 13, wherein generating the configuration setting based on the result comprises generating a configuration setting that is designed to improve the user experience of the computer program.

19. The system of claim 13, wherein the bin generation value corresponds a value of a pseudorandom sequence of values used to determine a divider value for bins of the histogram.

20. A computer-readable memory having computer-executable instructions stored thereon that, when executed by a computing device, cause the computing device to perform a method of modifying a configuration of a computer program, comprising:
monitoring an operation of the computer program, the operation being performed on a first computer;
collecting a plurality of data values based on the monitoring, the data values having a given data type, wherein the data type comprises the numeric range of possible values of the data values;
generating a histogram structure for each of selected ones of the plurality of data values plotted on the histogram structure, the histogram structure being based on the data type and a seed value, wherein the seed value comprises a random seed used to set a first value for a pseudorandom sequence and further specifies how the pseudorandom sequence is generated;
generating an encoded sample value for each of the selected ones of the plurality of data values indicating the generated histogram structure associated with each selected data value;
sending the encoded sample values to a second computer;
receiving a configuration setting from the second computer based on the encoded sample values and the seed value; and
modifying the configuration of the computer program by applying the configuration setting to the computer program.

21. A method of sending data from a first computer to a second computer, comprising:
collecting a plurality of data values on the first computer, the data values having a given data type, wherein the data type comprises the numeric range of possible values of the data values;
generating a histogram structure for each of the plurality of data values based on the data type and a seed value, wherein the seed value comprises a random seed used to set a first value for a pseudorandom sequence and further specifies how the pseudorandom sequence is generated;
generating an encoded sample value for each of the plurality of data values, based on each data value and the generated histogram structure associated with each data value; and
sending the encoded sample values and the seed value to the second computer, wherein at the second computer, based on the encoded sample values and the seed value, a cumulative distribution of the collected plurality of data values is generated.

\* \* \* \* \*

UNITED STATES PATENT AND TRADEMARK OFFICE
CERTIFICATE OF CORRECTION

| | | |
|---|---|---|
| PATENT NO. | : 8,943,177 B1 | Page 1 of 1 |
| APPLICATION NO. | : 13/182211 | |
| DATED | : January 27, 2015 | |
| INVENTOR(S) | : Peters et al. | |

It is certified that error appears in the above-identified patent and that said Letters Patent is hereby corrected as shown below:

In The Claims

Column 13, line 13, please replace "generate plurality of totals" with --generate a plurality of totals--.

Column 13, line 27, please replace "corresponds a value" with --corresponds to a value--.

Signed and Sealed this
Seventh Day of July, 2015

Michelle K. Lee
*Director of the United States Patent and Trademark Office*